UNITED STATES PATENT OFFICE.

ARVID NILSON, OF CHICAGO, ILLINOIS, ASSIGNOR TO WAHL & HENIUS, OF CHICAGO, ILLINOIS, A CORPORATION OF ILLINOIS.

MANUFACTURE OF NON-INTOXICATING BEVERAGES.

SPECIFICATION forming part of Letters Patent No. 721,383, dated February 24, 1903.

Application filed August 23, 1901. Serial No. 73,033. (No specimens.)

*To all whom it may concern:*

Be it known that I, ARVID NILSON, a subject of the King of Sweden and Norway, residing at Chicago, in the county of Cook and State of Illinois, have invented a new and useful Improvement in the Manufacture of Non-Intoxicating Beverages, of which the following is a specification.

My invention relates to an improved process of manufacturing a non-intoxicating beverage; and my object is to provide an economical process for producing such a beverage, more especially of the nature of beer, which shall possess all the properties of an ordinary beer except those which are derived from the presence of a considerable quantity of alcohol.

To practice my invention, I first mash the malt with or without malt adjuncts either in the ordinary way or, and preferably, in the way that will insure the production of the smallest possible percentage of sugar compatible with the desired complete conversion of the starchy matter of the cereals. As is well known in the art, this preferred manner of mashing may be accomplished by employing a high initial temperature of about 162.5° Fahrenheit and maintaining the mash at about that temperature until conversion is completed, the whole conversion requiring from about half an hour to, say, two hours, depending upon the diastatic power of the malt and the quantity of the especially-prepared flakes, if the latter be employed. The precise proportions of water and cereals used are immaterial. I prefer, however, to use about one hundred and ten pounds of cereal (malt alone, or with unmalted cereal) to each barrel of water. If such unmalted cereal, as grits or rice, be added to the malt, the mashing may be best performed as follows: The malt is mixed with the water in the mash-tun at a temperature of about 100° Fahrenheit, in the proportions of about one barrel of water to each one hundred pounds of malt, and the mashing is carried on for, say, half an hour, when about twenty-five per cent. of the liquid containing a large proportion of the diastase in solution is withdrawn. Meantime the cereal (grits or rice) is treated with a small proportion—say about twenty per cent.—of malt in a cooker by boiling the mixture for from about one-half an hour to one and one-half hours, depending on the fineness of the cereal and the structure of its starch, thus to prepare it for the action of the diastase in the mash-tun. Then the cereal mash is run into the malt mash as rapidly as possible, to pass over the sugar-forming temperatures, thereby raising the temperature of the malt mash from about 100° Fahrenheit to about 176° Fahrenheit, using live steam for heating if the cereal mash fails to bring the entire mixture in the mash-tun up to the desired temperature. Thereupon the liquid which has been withdrawn and which has been kept at a temperature of about 100° Fahrenheit is added to the mixture in the mash-tun, thereby reducing the temperature of the contents to about 162° Fahrenheit, and the mashing is continued at that temperature until the inversion is complete. By thus withdrawing a large portion of the diastase and raising the mash rapidly past the temperatures at which sugar is formed and adding the first diastase solution to the mash at such temperature as will mainly cause dextrine to be formed a wort is obtained with the desired high percentage of dextrine and low percentage of sugar. After running off the wort the grains should be sparged, as usual, and the spargings added to the wort. Instead now of concentrating the thus-obtained diluted wort by boiling it, which is the uniform practice in the production of ordinary beer, I cool down the wort to a comparatively low temperature—say to about 63.5° Fahrenheit or even to a lower suitable temperature—and run it into the fermenting-vats, thereby entirely omitting any boiling step of the wort between the mashing and fermenting steps, which is the primarily distinguishing characteristic of my improvement. The wort is then subjected to rapid fermentation in the vats, (not necessarily lasting longer than from twenty-four to thirty-six hours, and the time should never greatly exceed forty-eight hours,) under subjection to a temperature of about 63.5° Fahrenheit to 77° Fahrenheit, by the addition of yeast, preferably of the strong top-fermenting variety, though bottom-fermentation yeast may be used. According to the gravity of the wort and the character of the yeast employed from one-half a pound to two pounds of yeast are used for each barrel of wort. Thus the sugar is fermented to within one to two per cent., and a corresponding amount of alcohol is formed, and this rapid fermentation to which the wort is subjected forms another distinguishing characteristic in my improved process. The fermented product thus obtained is then separated from the yeast, as by decantation or skimming off the yeast, which removes the greater part of the latter, or the yeast may be entirely removed, if desired, by filtration, and the separated liquid is run into the brewing-kettle, wherein it is boiled to expel the alcohol, about an hour and a half to three hours sufficing for the boiling operation, which not only removes the alcohol almost completely or to within a small percentage— say one per cent. or less—which is the primary purpose of the boiling, but effects other desirable changes—namely, those particularly of precipitating the albuminoids and giving the desired cooked taste to the product. The hops may be added during the boiling period, if desired, and are preferably added at that time. This boiled product, practically devoid of alcohol, is then cooled down to a temperature of about 41° Fahrenheit or even lower and run into casks for such further treatment as may be desired. Thus if the desire be to produce a beverage entirely free, practically, from alcohol the necessary life may be given to the beverage by artificially charging it with carbonic-acid gas under pressure in the usual or any suitable manner. If on the other hand there shall be no objection to having a slight proportion— say up to one per cent.—of alcohol in the beverage, the desired carbonic-acid gas may be introduced into the cooled product of the boiling operation by subjecting it to a slight secondary fermentation, as by the addition of "kraeusen." Further treatment of the beverage may be that to which ordinary beer is commonly subjected to complete its preparation for the market.

The advantages of my improvement are due to its characterizing feature of omitting the boiling operation between the mashing and fermenting steps. This boiling is resorted to in the production of ordinary beer to extract the hop flavor from the hops and cook the malt, and when the liquid is subjected to boiling after fermentation also, thus the second time, to remove the alcohol the alcohol is not only removed, but the hop flavor is likewise dissipated, thus taking out the most essential element that gives the decided beer flavor, and by thus cooking twice not only is the hop aroma removed, but the bitter quality of the hops is enhanced to the detriment of the taste. Moreover, the second boiling overcooks the malt extract, thereby imparting to the beverage an undesirable bitter or "bready" taste, besides unduly darkening its color. By omitting any boiling of the wort between the mashing and fermenting stages and adding the hops during the boiling operation after fermentation I introduce into and maintain in the product the hop aroma, thus avoiding its dissipation in expelling the alcohol and also avoiding the second cooking of the malt extract with its undesirable effect.

What I claim as new, and desire to secure by Letters Patent, is—

1. The process of manufacturing a non-intoxicating beverage, which consists in mashing the grain, drawing off and cooling the wort, subjecting the wort, without previous boiling, to fermentation and then boiling the fermented product to expel the alcohol, cooling down the boiled product, and introducing carbonic-acid gas therein.

2. The process of manufacturing a non-intoxicating beverage, which consists in mashing the grain, drawing off and cooling the wort, subjecting the wort, without previous boiling, to fermentation, then boiling the fermented product to expel the alcohol, and adding hops, cooling down the boiled product and introducing carbonic-acid gas therein.

3. The process of manufacturing a non-intoxicating beverage, which consists in mashing the grain, drawing off and cooling the wort, subjecting the wort, without previous boiling, to rapid fermentation, boiling the fermented product to expel the alcohol, cooling down the boiled product, and introducing carbonic-acid gas therein, substantially as described.

4. The process of manufacturing a non-intoxicating beverage, which consists in mashing the grain, drawing off and cooling the wort, subjecting the wort, without previous boiling, to rapid fermentation, boiling the fermented product to expel the alcohol and adding hops, cooling down the boiled product and introducing carbonic-acid gas therein, substantially as described.

5. The process of manufacturing a non-intoxicating beverage, which consists in mashing and sparging the grain, drawing off the wort and mixing therewith the spargings, cooling down the diluted wort and subjecting it, without previous boiling, to rapid fermentation, removing the yeast and then boiling the fermented product to expel the alcohol and adding hops during the boiling operation, cooling down the boiled product, and introducing carbonic-acid gas therein, substantially as described.

6. The process of manufacturing a non-intoxicating beverage, which consists in mashing the grain to produce the smallest percentage of sugar compatible with complete conversion of the starchy matter, drawing off and cooling the wort, subjecting the wort, without previous boiling, to rapid fermentation, then boiling the fermented product to expel the alcohol and adding hops, cooling down the boiled product, and introducing carbonic-acid gas therein, substantially as described.

7. The process of manufacturing a non-intoxicating beverage, which consists in mashing the grain to produce the smallest percentage of sugar compatible with complete conversion of the starchy matter, and sparging, drawing off the wort and mixing therewith the spargings, cooling down the diluted wort and subjecting it, without previous boiling, to rapid fermentation, removing the yeast and then boiling the fermented product to expel the alcohol and adding hops, cooling down the boiled product, and introducing carbonic-acid gas therein, substantially as described.

ARVID NILSON.

In presence of—
D. W. LEE,
ALBERT D. BACCI.